(12) United States Patent
Yamamoto et al.

(10) Patent No.: US 8,461,976 B2
(45) Date of Patent: Jun. 11, 2013

(54) ON-VEHICLE DEVICE AND RECOGNITION SUPPORT SYSTEM

(75) Inventors: Tetsuo Yamamoto, Kobe (JP); Kimitaka Murashita, Kobe (JP); Yasuyoshi Sawada, Kobe (JP); Takechika Kiriya, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 201 days.

(21) Appl. No.: 12/945,096

(22) Filed: Nov. 12, 2010

(65) Prior Publication Data
US 2011/0128138 A1  Jun. 2, 2011

(30) Foreign Application Priority Data

Nov. 30, 2009  (JP) .................................. 2009-272859

(51) Int. Cl.
*B60Q 1/00* (2006.01)
(52) U.S. Cl.
USPC ............ 340/436; 340/435; 340/461; 348/148
(58) Field of Classification Search
USPC .. 340/435, 436, 461, 459, 901–904; 348/148, 348/E7.08, 43, 118, 135
See application file for complete search history.

(56) References Cited

U.S. PATENT DOCUMENTS

| | | |
|---|---|---|
| 6,993,159 B1 | 1/2006 | Ishii et al. |
| 7,110,021 B2 * | 9/2006 | Nobori et al. ................. 348/148 |
| 8,144,002 B2 | 3/2012 | Kiuchi |
| 2009/0059005 A1 * | 3/2009 | Hattori et al. ................. 348/148 |
| 2010/0134593 A1 * | 6/2010 | Kakinami ....................... 348/43 |

FOREIGN PATENT DOCUMENTS

| | | |
|---|---|---|
| CN | 1373720 A | 10/2002 |
| CN | 1785723 A | 6/2006 |
| CN | 101549648 A | 10/2009 |
| JP | A-2002-321579 | 11/2002 |
| JP | A-2004-274538 | 9/2004 |
| JP | A-2007-69806 | 3/2007 |
| JP | A-2008-238927 | 10/2008 |
| JP | A-2008-293122 | 12/2008 |
| JP | A-2009-65483 | 3/2009 |

OTHER PUBLICATIONS

Jan. 6, 2013 Office Action issued in Chinese Application No. 201010568747.9 (with English Translation).

* cited by examiner

*Primary Examiner* — Anh V La
(74) *Attorney, Agent, or Firm* — Oliff & Berridge, PLC

(57) ABSTRACT

An on-vehicle device mounted on a vehicle includes an imaging unit that captures an image of a wide angle range through a curved light receiver, a moving-object detector that detects a moving object approaching an own vehicle from a mounting direction of the imaging unit and from any direction other than the mounting direction, based on the image captured by the imaging unit, a collision-risk determination unit that determines a degree of collision risk indicating a possibility of collision between the moving object detected by the moving-object detector and the own vehicle, and a moving-object warning unit that warns presence of the moving object included in an image portion in which a distortion of the image is a predetermined value or more, and warns the presence of the moving object according to the degree of collision risk determined by the collision-risk determination unit.

6 Claims, 8 Drawing Sheets

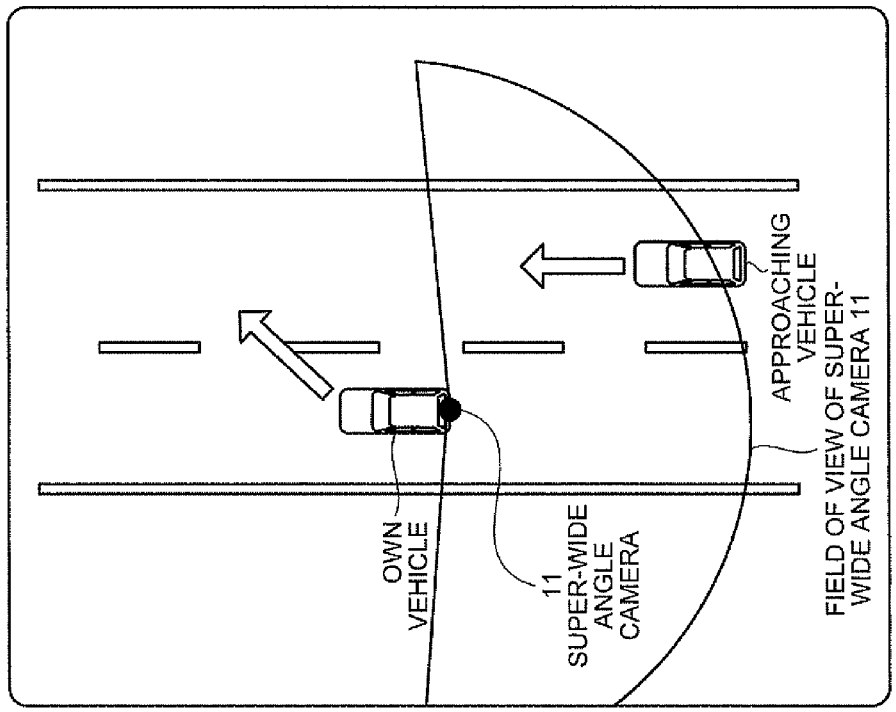
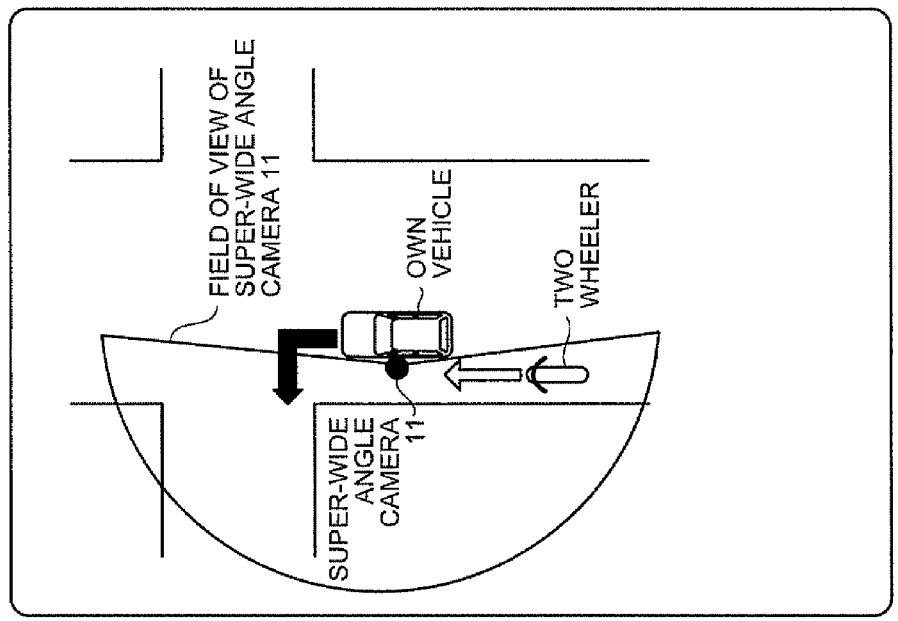

ON-VEHICLE DEVICE AND RECOGNITION SUPPORT SYSTEM

CROSS-REFERENCE TO RELATED APPLICATION

This application is based upon and claims the benefit of priority of the prior Japanese Patent Application No. 2009-272859, filed on Nov. 30, 2009, the entire contents of which are incorporated herein by reference.

BACKGROUND OF THE INVENTION

1. Field of the Invention

The present invention relates to an on-vehicle device mounted on a vehicle and a recognition support system, and more particularly, to an on-vehicle device and a recognition support system capable of achieving cost reduction of the on-vehicle device and allowing a driver to reliably recognize the presence of a detected moving object while preventing detection omission of a moving object approaching an own vehicle from a blind corner for the driver.

2. Description of the Related Art

Recently, there have been developed a number of on-vehicle devices that detect a moving object around a vehicle by an image captured by a camera and by using sensors or the like and warn the risk when an own vehicle and the moving object may collide with each other.

For example, Japanese Patent Application Laid-open No. 2007-69806 discloses an on-vehicle device that detects an obstacle that may collide with an own vehicle from images captured by a plurality of vehicle-mounted cameras mounted on a vehicle such as an automobile, and warns a driver of that effect.

Japanese Patent Application Laid-open No. 2004-274538 discloses an on-vehicle device that detects a vehicle that is approaching an own vehicle from a blind corner for a driver by analyzing an image captured by a vehicle-mounted camera of the own vehicle, and alerts the driver by warning the driver that the vehicle is approaching.

More specifically, the on-vehicle device described in Japanese Patent Application Laid-open No. 2004-274538 simultaneously captures right-side image and left-side image of the own vehicle by a single vehicle-mounted camera with a built-in prism. The on-vehicle device described in Japanese Patent Application Laid-open No. 2007-69806 warns the driver of the approaching vehicle by displaying captured lateral images side-by-side.

However, because the on-vehicle device described in Japanese Patent Application Laid-open No. 2007-69806 requires a plurality of vehicle-mounted cameras, there arises a problem that the cost required for the vehicle-mounted cameras increases.

In addition, because the on-vehicle device described in Japanese Patent Application Laid-open No. 2004-274538 displays the right-side and left-side images side-by-side on a display unit, there arises a problem that it is difficult for the driver to know a distance between the right side and the left side.

Moreover, in the on-vehicle device described in Japanese Patent Application Laid-open No. 2004-274538, the right-side and left-side images are captured by the vehicle-mounted camera, but a front-side image is not captured. More specifically, because the front side of the vehicle becomes a blind corner, it is impossible to detect an approaching vehicle that may be highly dangerous to the own vehicle. Therefore, the driver has to confirm the safety in front of the own vehicle by the driver's view, however, it is difficult to cover the blind corner only with the driver's view.

From these problems, it remains a big challenge how to achieve an on-vehicle device and a recognition support system capable of achieving cost reduction of the on-vehicle device and allowing a driver to reliably recognize the presence of a detected moving object while preventing detection omission of a moving object approaching an own vehicle from a blind corner for the driver.

SUMMARY OF THE INVENTION

It is an object of the present invention to at least partially solve the problems in the conventional technology.

An on-vehicle device according to one aspect of the present invention is an on-vehicle device mounted on a vehicle, and includes an imaging unit that captures an image of a wide angle range through a curved light receiver, a moving-object detector that detects a moving object approaching an own vehicle from a mounting direction of the imaging unit and from any direction other than the mounting direction, based on the image captured by the imaging unit, a collision-risk determination unit that determines a degree of collision risk indicating a possibility of collision between the moving object detected by the moving-object detector and the own vehicle, and a moving-object warning unit that warns presence of the moving object included in an image portion in which a distortion of the image is a predetermined value or more, and warns the presence of the moving object according to the degree of collision risk determined by the collision-risk determination unit Further, a recognition support system according to another aspect of the present invention includes an on-vehicle device mounted on a vehicle, and a ground server device that performs wireless communication with the on-vehicle device, wherein the on-vehicle device or the ground server device includes a moving-object detector that detects a moving object approaching a vehicle mounting thereon the on-vehicle device based on an image received from the on-vehicle device, and a collision-risk determination unit that determines a degree of collision risk indicating a possibility of collision between the moving object detected by the moving-object detector and the vehicle, and the on-vehicle device includes an imaging unit that captures an image of a wide angle range through a curved light receiver, and a moving-object warning unit that warns presence of the moving object included in an image portion in which a distortion of the image is a predetermined value or more, and warns the presence of the moving object according to the degree of collision risk determined by the collision-risk determination unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 8A and 8B are diagrams illustrating examples of a mounting direction of a super-wide angle camera.

DETAILED DESCRIPTION OF THE PREFERRED EMBODIMENTS

Preferred embodiments of the on-vehicle device and the recognition support system according to the present invention will be explained in detail below with reference to the accompanying drawings. Hereinafter, an overview of the on-vehicle device and the recognition support system according to the present invention will be explained with reference to FIGS. 1A and 1B, and then the embodiments of the on-vehicle device and the recognition support system according to the present invention will be explained with reference to FIG. 2 to FIG. 8B.

Figure 1A:
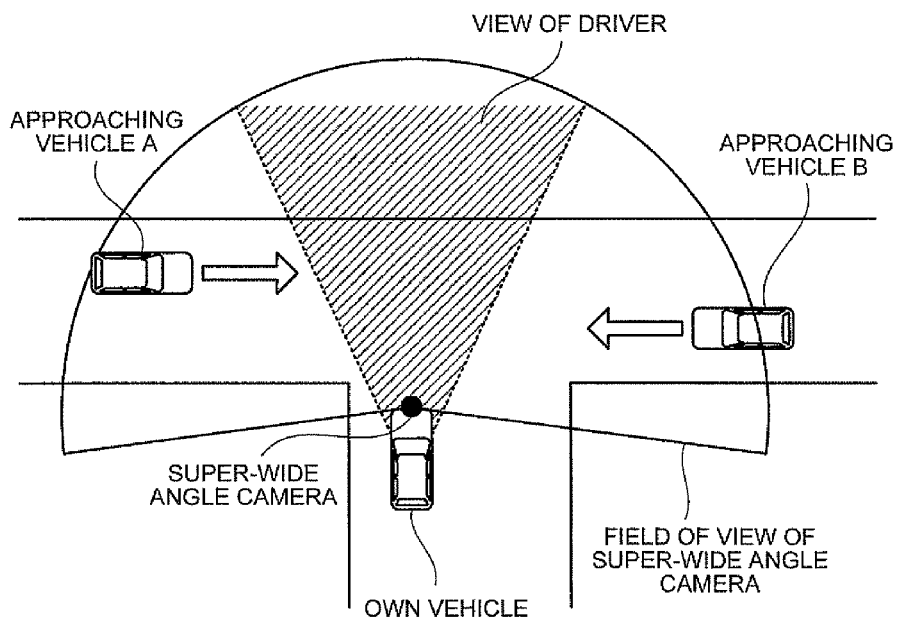
FIGS. 1A and 1B are diagrams illustrating an overview of an on-vehicle device and a recognition support system according to the present invention.
Figure 1B:
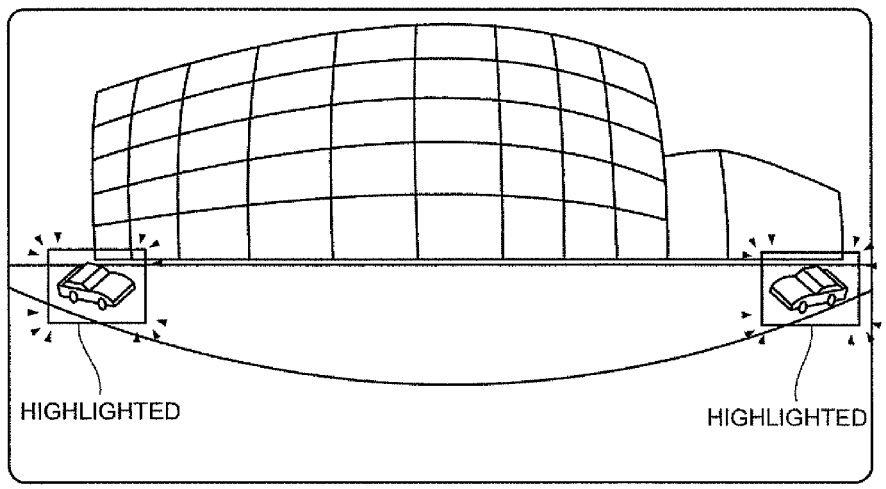

First, the overview of the on-vehicle device and the recognition support system according to the present invention will be explained with reference to FIGS. 1A and 1B. FIGS. 1A and 1B are diagrams illustrating the overview of the on-vehicle device and the recognition support system according to the present invention.

As shown in FIGS. 1A and 1B, the on-vehicle device and the recognition support system according to the present invention are configured to detect a moving object based on a wide-angle image captured by a super-wide angle camera mounted on a vehicle, determine the degree of risk that the detected moving object collides with the own vehicle, and highlight the moving object according to the determined degree of collision risk.

More specifically, the on-vehicle device and the recognition support system according to the present invention are mainly characterized in that when images in a wide field of view are captured by a single super-wide angle camera, a driver is warned of a moving object having a high risk detected from among the captured images, which provides recognition support to the driver.

The characteristic points will be specifically explained below. As shown in FIG. 1A, the view of the driver who is looking ahead of the vehicle is an area indicated by diagonal lines. Areas other than the area indicated by the diagonal lines are blind corners for the driver.

Here, the on-vehicle device according to the present invention is connected to a super-wide angle camera mounted on the front of an own vehicle. An imaging range (hereinafter described as "field of view") of the super-wide angle camera is an area indicated as a circular arc in this figure, which becomes a wide field of view including the driver's view and the blind corners. Therefore, if the super-wide angle camera is used, there is no need to mount cameras on two lateral locations to capture right and left images of the own vehicle.

As shown in FIG. 1A, the own vehicle is about to enter an intersection, and an approaching vehicle A is running toward the own-vehicle side from the road on the left side at the intersection. In addition, an approaching vehicle B is running toward the own-vehicle side from the road on the right side at the intersection.

The super-wide angle camera mounted on the own vehicle captures an image of the circular range in FIG. 1A. Here, the image captured by the super-wide angle camera has a low resolution in a distant area, particularly, in lateral areas of the image, and thus it is difficult for the driver to visually recognize the moving object. Therefore, the on-vehicle device according to the present invention complements the resolution of the captured image to correct distortions of the lateral areas. This allows improvement of sharpness of the image.

The on-vehicle device according to the present invention detects whether there is a moving object based on the corrected image. This allows detection of a moving object that may be overlooked by the conventional on-vehicle device. Moreover, the on-vehicle device according to the present invention acquires moving-object information based on the corrected image and information received from a radar mounted on the own vehicle. Here, the moving-object information includes a distance between the own vehicle and the moving object, an approaching direction of the moving object with respect to the own vehicle, and a moving speed of the moving object.

In addition, the on-vehicle device according to the present invention acquires own-vehicle information including a running speed, a running direction, and a running position of the own vehicle based on information received from various sensors. Thereafter, the on-vehicle device according to the present invention determines the degree of collision risk indicating a possibility of collision between the own vehicle and the moving object based on the own-vehicle information and the moving-object information. Details about a method of determining the degree of collision risk will be explained later.

As shown in FIG. 1B, the on-vehicle device according to the present invention highlights the moving object having a high degree of collision risk by blinking a frame around the moving object and changing the color of the moving object, and displays the highlighted moving object on a display unit such as a display.

In this manner, the on-vehicle device and the recognition support system according to the present invention are configured to detect the moving object based on the image captured by the super-wide angle camera mounted on the vehicle, determine the degree of risk that the detected moving object collides with the own vehicle, and highlight the moving object according to the determined degree of collision risk.

Therefore, according to the on-vehicle device and the recognition support system of the present invention, it is possible to achieve cost reduction for the on-vehicle device and allow the driver to reliably recognize the presence of a detected moving object while preventing detection omission of a moving object approaching the own vehicle from a wide angle range including a blind corner for the driver.

An embodiment of the on-vehicle device and the recognition support system whose overview has been explained with reference to FIGS. 1A and 1B will be explained in detail below. First, the configuration of an on-vehicle device 10 according to the present embodiment will be explained below with reference to FIG. 2.

Figure 2:
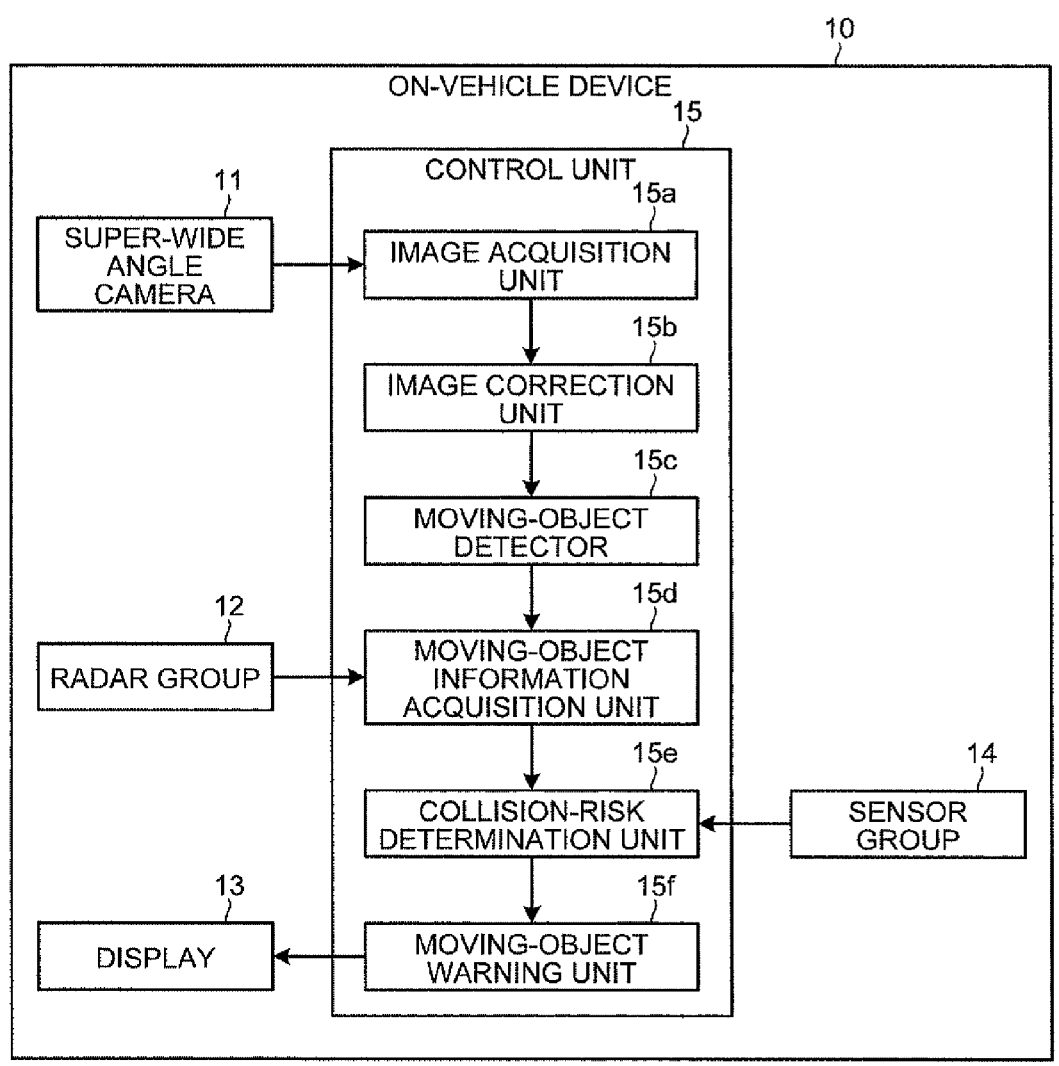
FIG. 2 is a block diagram of a configuration of the on-vehicle device according to an embodiment of the present invention.

FIG. 2 is a block diagram of the configuration of the on-vehicle device 10 according to the present embodiment. FIG. 2 selectively shows only constituent elements required to explain the characteristic points of the on-vehicle device 10. As shown in this figure, the on-vehicle device 10 includes a super-wide angle camera 11, a radar group 12, a display 13, a sensor group 14, and a control unit 15. Furthermore, the control unit 15 includes an image acquisition unit 15a, an image correction unit 15b, a moving-object detector 15c, a moving-object information acquisition unit 15d, a collision-risk determination unit 15e, and a moving-object warning unit 15f.

The super-wide angle camera 11 is a camera capable of capturing an image of a wide angle range, for example, in a range with a 190-degree view, because a light receiver corresponding to a lens is curved to cause a focal point to be short. The super-wide angle camera 11 is mounted on the front of the vehicle, and captures frontward, leftward, and rightward images of the vehicle. It should be noted that the present embodiment explains the case where the super-wide angle camera 11 is mounted on the front side of the vehicle. However, the super-wide angle camera 11 may be mounted on the rear side, the left side, or the right side of the vehicle.

The radar group 12 is a group of radar devices, being devices including a millimeter-wave radar and a laser radar, that transmits an electromagnetic wave to an object and measures a reflective wave of the object to thereby acquire a distance to the object and a direction thereof. The radar group 12 acquires moving-object information including a distance between the own vehicle and the moving object, an approaching direction of the moving object with respect to the own vehicle, and a moving speed of the moving object. The radar group 12 also performs a process of transferring the acquired moving-object information to the moving-object information acquisition unit 15d. It should be noted that the radar group 12 may be configured with a single radar device.

The display 13 is a display device that displays an image captured by the super-wide angle camera 11, and the on-vehicle device 10 including a car navigation function may sometimes display thereon a road map and a route to a destination.

The sensor group 14 is a device configured with various sensors, for example, a gyro sensor, a rudder angle sensor, a GPS (Global Positioning System) receiver, and a speed sensor, that detect physical quantities as objects to be measured such as sound and light.

The sensor group 14 acquires own-vehicle information including a running speed, a running direction, and a running position of the own vehicle. More specifically, the sensor group 14 acquires the running direction of the own vehicle, based on angle information detected by the gyro sensor and to which direction a steering wheel of the own vehicle is directed detected by the rudder angle sensor. In addition, the sensor group 14 acquires the running position of the own vehicle through information received from the GPS receiver, and acquires an absolute speed of the own vehicle through information from the speed sensor. The sensor group 14 also performs the process of transferring the acquired own-vehicle information to the collision-risk determination unit 15e.

The control unit 15 controls the entire on-vehicle device 10. The image acquisition unit 15a is a processor that performs a process of acquiring an image captured by the super-wide angle camera 11. The image acquisition unit 15a also performs a process of transferring the acquired image to the image correction unit 15b.

The image correction unit 15b is a processor that performs a process of correcting a distortion of the image received from the image acquisition unit 15a and improving the sharpness of the image. Here, a specific example of the image correction process will be explained with reference to FIGS. 3A and 3B.

Figure 3A:
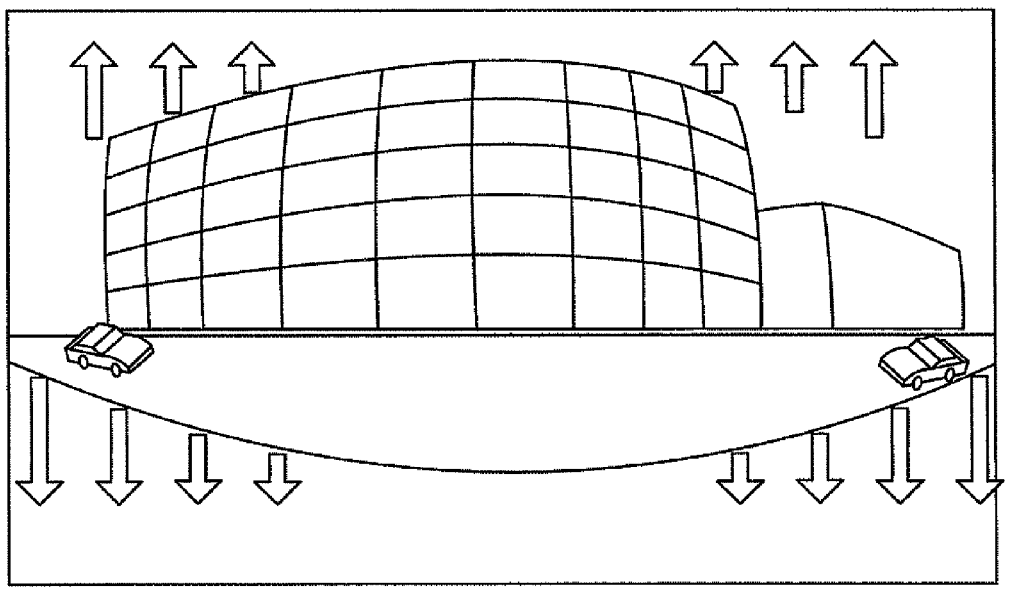
FIGS. 3A and 3B are diagrams for explaining an image correction process.
Figure 3B:
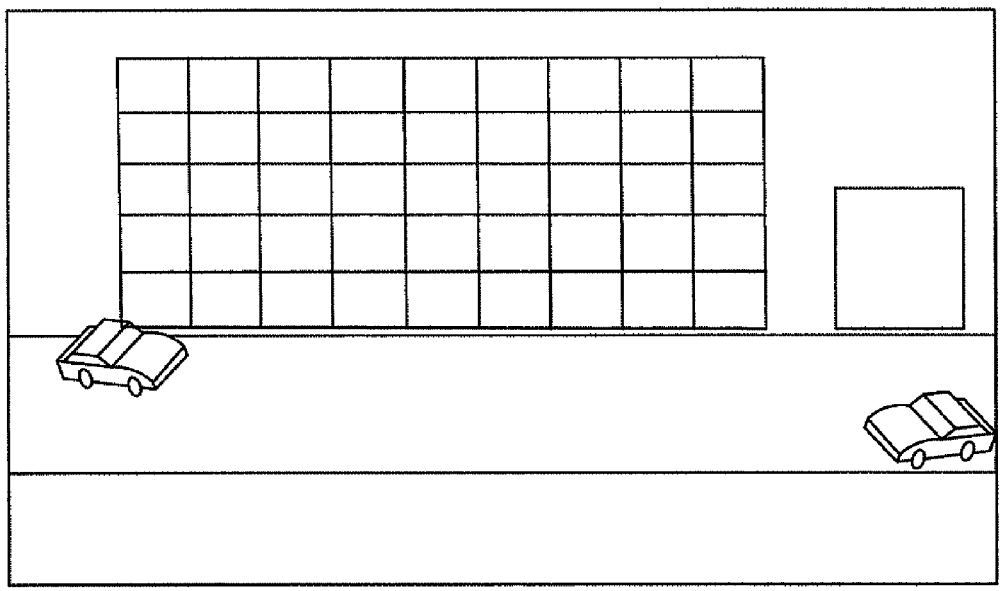

FIGS. 3A and 3B are diagrams for explaining the image correction process. It should be noted that FIG. 3A represents an image captured by the super-wide angle camera 11 while FIG. 3B represents an image after the image correction process is performed.

As shown in FIG. 3A, the image captured by the super-wide angle camera 11 is distorted in a distant area, particularly, in lateral areas of the image, and the images in these areas shrink. Moreover, the areas in which the images shrink have a low resolution.

Therefore, the image correction unit 15b performs the correction process on the image captured by the super-wide angle camera 11 while changing a correction amount of the resolution according to each area within the image. Arrows in FIG. 3A indicate each magnitude of the correction amount. As a method of performing the correction process, for example, "super-resolution technique" as a known technique, "cylindrical projection" as one of map projection systems, or the like can be used.

Here, the "super-resolution technique" is a technique of complementing a resolution by increasing the number of pixels in order to improve the resolution. More specifically, the "super-resolution technique" is a technique for complementing the resolution of a target image based on information on pixels of a plurality of images obtained by time-slicing the image.

As shown in FIG. 3A, the image correction unit 15b complements the resolution by using the "super-resolution technique" in such a manner that the correction amount is increased, particularly, in the lateral areas of the image with a low resolution and near horizon areas where moving objects appear and that the correction amount is decreased in the central area of the image.

Subsequently, the image correction unit 15b corrects the distortion of the image captured by the super-wide angle camera 11 using the "cylindrical projection". In this way, as shown in FIG. 3B, the image after the image correction process is performed contributes to improvement of detection precision of the moving-object detector 15c, which is explained later. Even if the image after the image correction process is performed is displayed on the display 13 as it is, the driver can easily know the distance.

Referring back to the explanation of FIG. 2, the explanation of the on-vehicle device 10 is continued. The moving-object detector 15c is a processor that performs the process of detecting whether there is a moving object by calculating optical flows based on the image corrected by the image correction unit 15b. The optical flow mentioned here represents that a movement of an object in temporally continuous images is indicated by a vector.

Figure 4A:
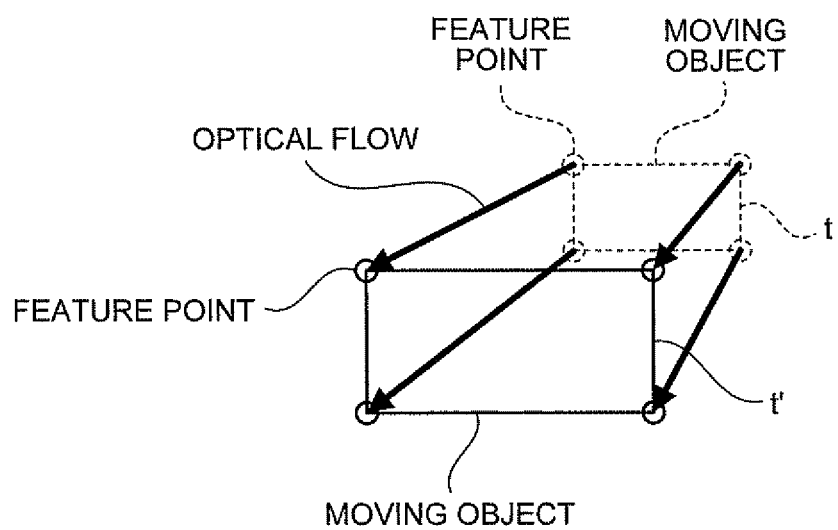
FIGS. 4A and 4B are diagrams for explaining a moving-object detection process.
Figure 4B:
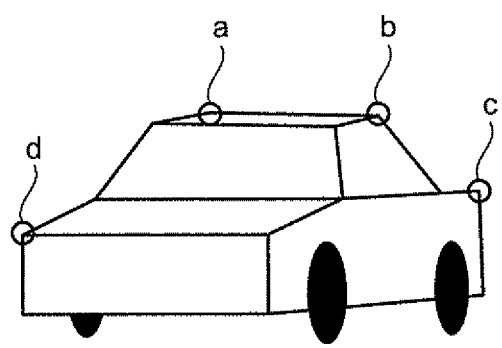

Here, a moving-object detection process is specifically explained with reference to FIGS. 4A and 4B. FIGS. 4A and 4B are diagrams for explaining the moving-object detection process. FIG. 4A represents a diagram for explaining the optical flows and FIG. 4B represents an example of representative points.

FIG. 4A indicates temporally continuous two images in a superimposed manner. Here, an image at time t is indicated by dashed lines, and an image at time t' is indicated by solid lines. The time t is set as a time previous to the time t'.

First, the moving-object detector 15c detects feature points from the image at the time t. Here, four points indicated by dashed line circles are detected as the feature points. Subsequently, the moving-object detector 15c detects feature points from the image at the time t'. Here, four points indicated by solid line circles are detected as the feature points.

Here, the vectors from the feature points at the time t to the feature points at the time t' are optical flows respectively. By subtracting the movement of the own vehicle from the generated optical flows, the moving-object detector 15c can detect the movement vector of the object (hereinafter simply described as "movement vector").

The moving-object detector 15c then detects the moving object based on the detected movement vector. If the length of the movement vector is longer than 0, then the moving-object detector 15c recognizes the object as being moving and thus determines the object as a moving object. Furthermore, the moving-object detector 15c determines whether the moving object is approaching the own vehicle based on the direction of the movement vector.

The moving object is detected based on the length of the movement vector as 0, however, the moving object may be detected using a predetermined threshold value as reference. Furthermore, there is no need to use all the detected feature points for a predetermined object. As shown in FIG. 4B, when point a, point b, point c, and point d are detected as feature points, then, for example, the point c and the point d may be extracted as representative points to detect the moving object. In this way, the moving-object detector 15c detects the moving object.

Referring back to the explanation of FIG. 2, the explanation of the on-vehicle device 10 is continued. The moving-object information acquisition unit 15d is a processor that performs a process of acquiring moving-object information, for the moving object detected by the moving-object detector 15c, including a distance between the own vehicle and the moving object, an approaching direction of the moving object with respect to the own vehicle, and a moving speed of the moving object, from the radar group 12.

The collision-risk determination unit 15e is a processor that performs a process of determining a degree of collision risk, about the moving object detected by the moving-object detector 15c, indicating a possibility of collision between the own vehicle and the moving object based on the moving-object information acquired by the moving-object information acquisition unit 15d and the own-vehicle information acquired from the sensor group 14.

Here, the collision-risk, determination process will be specifically explained with reference to FIGS. 5A to 5C and FIG. 6. FIGS. 5A to 5C and FIG. 6 are diagrams for explaining the collision-risk determination process in different situations.

Figure 5A:
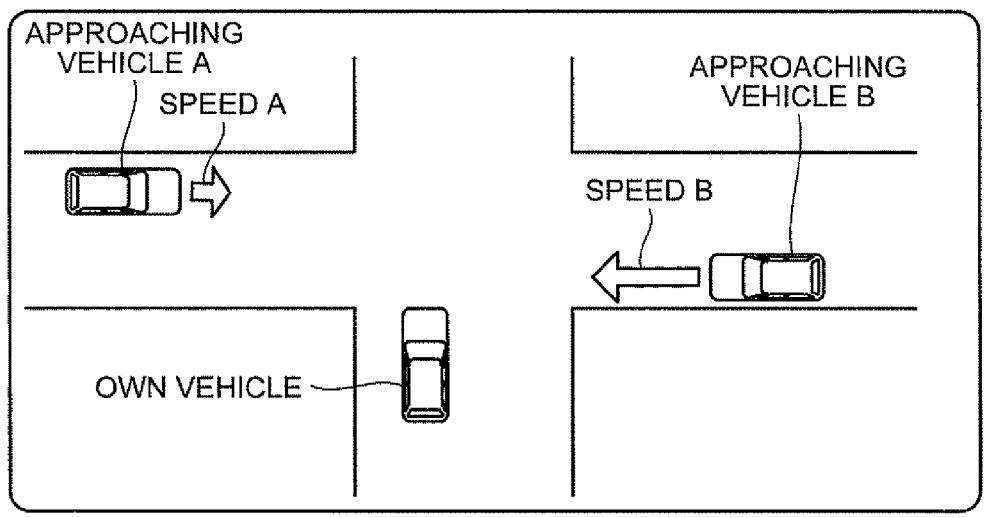
FIGS. 5A to 5C are diagrams for explaining a collision-risk determination process in some situations.

First, as shown in FIG. 5A, the own vehicle comes to an intersection. An approaching vehicle A is running toward the own-vehicle side at a speed A from the left side of the road which the own vehicle is about to enter. An approaching vehicle B is running toward the own-vehicle side at a speed B from the right side of the road. The length of each arrow indicating a speed is proportional to the speed. Therefore, FIG. 5A indicates that speed A<speed B.

In this case, as a result of comparison of a distance between the own vehicle and the approaching vehicle A with a distance between the own vehicle and the approaching vehicle B, it is determined that both the distances are almost the same as each other. However, because the speed A<the speed B is determined as a result of comparison between the speed A of the approaching vehicle A and the speed B of the approaching vehicle B, the collision-risk determination unit 15e determines that the approaching vehicle B has a higher degree of collision risk indicating the possibility of collision with the own vehicle than the approaching vehicle A has.

Figure 5B:
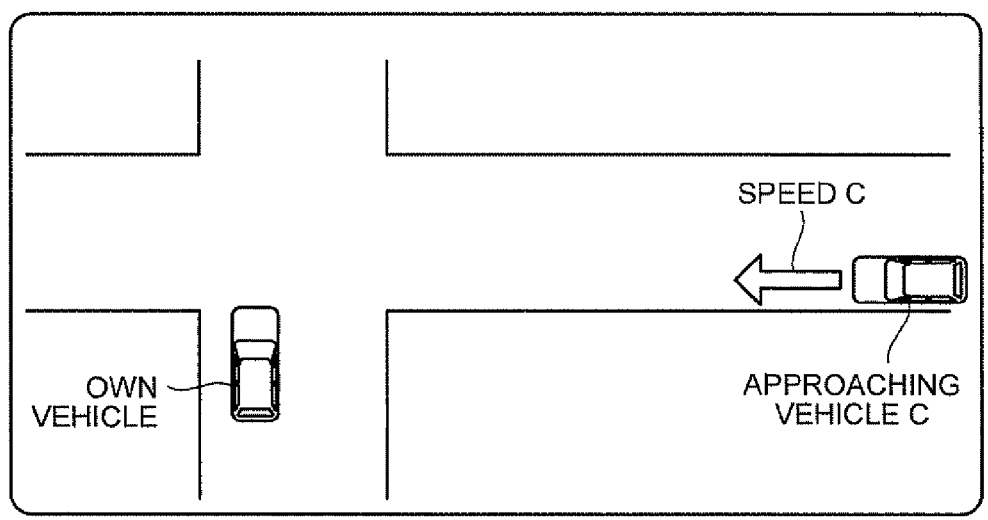

Subsequently, a situation different from that of FIG. 5A will be explained below. As shown in FIG. 5B, the own vehicle comes to an intersection, and an approaching vehicle C is running toward the own-vehicle side at a speed C from the right side of the road which the own vehicle is about to enter. Here, the speed C is the same as the speed B shown in FIG. 5A.

In this case, a distance between the own vehicle and the approaching vehicle C is much longer than the distance between the approaching vehicle B and the own vehicle shown in FIG. 5A. More specifically, the approaching vehicle C is running still in the distance though its running speed is high. Therefore, the collision-risk determination unit 15e determines that the degree of collision risk of the approaching vehicle C is lower than that of the approaching vehicle B.

Figure 5C:
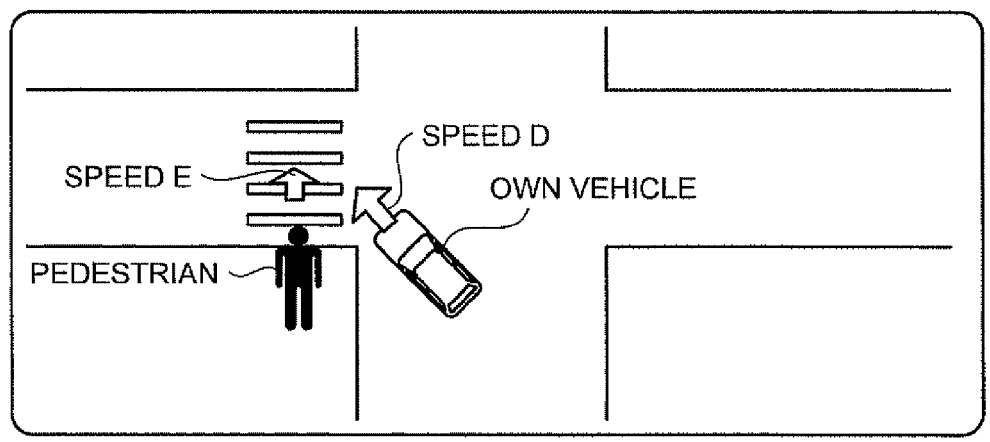

In addition, as shown in FIG. 5C, a pedestrian starts walking on a pedestrian crossing at a speed E when the own vehicle is turning to the left at the intersection. Here, because the speed E is a walking speed, it is much slower as compared to the speed B and the speed C.

However, the own vehicle and the pedestrian being the moving object are relatively approaching each other, and the moving object is at a very close position to the own vehicle. Therefore, the collision-risk determination unit 15e determines that the degree of collision risk of the pedestrian is very high.

In this way, the collision-risk determination unit 15e determines the degree of collision risk based on the distance between the own vehicle and the approaching vehicle, the relative speed between the own vehicle and the approaching vehicle, and the approaching direction of the moving object with respect to the own vehicle which are calculated based on the moving-object information and the own-vehicle information. This allows high-precision determination on the degree of collision risk.

The explanation is made so that the collision-risk determination unit 15e determines that the degree of collision risk is high or low. However, the degree of collision risk may be indicated by a numerical value, for example, by the degree of collision risk: 1 to 5 according to values such as the distance and the relative speed.

In addition, the collision-risk determination unit 15e determines the degree of collision risk based on the moving-object information and the own-vehicle information, however, the collision-risk determination unit 15e may determine the degree of collision risk by acquiring map information from a car navigation function (not shown) provided in the on-vehicle device 10 or by acquiring the state of a blinker.

Figure 6:
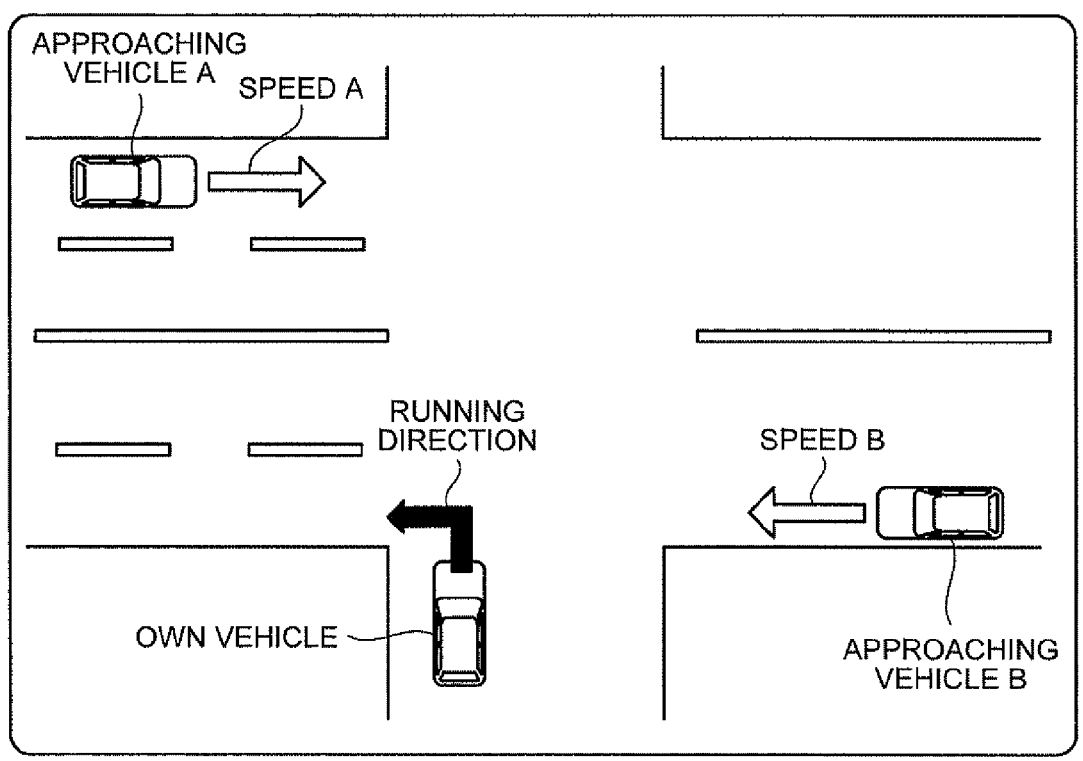
FIG. 6 is a diagram for explaining the collision-risk determination process in another situation.

For example, as shown in FIG. 6, the own vehicle stops in front of the intersection before it is about to enter the intersection. The approaching vehicle A is running toward the own-vehicle side at the speed A from the left side of the road which the own vehicle is about to enter. Moreover, the approaching vehicle B is running toward the own-vehicle side at the speed B from the right side of the road. Here, the speed A and the speed B are the same as each other.

Here, when acquiring information indicating that the own vehicle is operating a left blinker, the collision-risk determination unit 15e determines that the running direction (black arrow in FIG. 6) after the own vehicle enters the intersection is the left. In addition, the collision-risk determination unit 15e acquires the map information, to determine that the intersection shown in FIG. 6 is a wide road with two lanes each way, that the approaching vehicle B is running on the lane in the same direction as that of the lane into which the own vehicle merges, and that the approaching vehicle A is running on the lane opposite to the lane into which the own vehicle merges.

Therefore, the collision-risk determination unit 15e determines that the degree of collision risk of the approaching vehicle B is high. Meanwhile, the speed A of the approaching vehicle A is the same as that of the approaching vehicle B, and the distance thereof with the own vehicle is nearly the same as that of the approaching vehicle B, however, it is determined that the degree of collision risk of the approaching vehicle A is low because of running on the opposite lane.

Thus, the collision-risk determination unit 15e may determine the degree of collision risk based on the information or the like from any device other than the radar group 12 or the sensor group 14.

Referring back to the explanation of FIG. 2, the explanation of the on-vehicle device 10 is continued. The moving-object warning unit 15f is a processor that performs a process of highlighting the moving object according to the degree of collision risk determined by the collision-risk determination unit 15e and displaying the highlighted moving object on the display 13. For example, the moving-object warning unit 15f displays the speed of the moving object and the distance between the moving object and the own vehicle by superimposing them on the image captured by the super-wide angle camera 11.

In addition, when the degree of collision risk of the moving object is high, the moving-object warning unit 15f may highlight the moving object and display the highlighted moving object on the display 13. For example, the moving-object warning unit 15f performs the display of the moving object by showing an enclosing frame around the moving object, blinking the enclosing frame or the entire image, or changing the color of the moving object.

Moreover, the moving-object warning unit 15f may change the number of blinks or change the color according to the degree of collision risk. For example, if the degree of collision risk is set to three ranks: high, medium, and low degrees, then each display may be set in such a manner that the number of blinks at the high degree of collision risk is 10 and the color is red; the number of blinks at the medium degree is 5 and the color is yellow; and the number of blinks at the low degree is 3 and the color is white.

It should be noted that a target image whose highlight is displayed in a superimposed manner may be an image captured by the super-wide angle camera 11 (see FIG. 3A) or may be an image corrected by the image correction unit 15b (see FIG. 3B).

In addition, when a moving object detected by the moving-object detector 15c is included in an image portion in which a distortion of the image (see FIG. 3A) captured by the super-wide angle camera 11 is a predetermined value or more, the moving-object warning unit 15f may highlight the moving object.

The value of distortion is determined according to the magnitude of the distortion obtained as a result of comparison between an actual distorted image and an estimated image without distortion of a portion corresponding to a linear segment such as a white line on the road. For example, each of the sizes of the arrows in FIG. 3A indicates each magnitude of the distortion. Moreover, a certain range on the image may be set as a portion to be highlighted based on the magnitude of the curve of the light receiver.

Because the light receiver of the super-wide angle camera 11 is curved, a peripheral portion of the captured image is displayed in such a manner that it is distorted more than its central portion. Because of this, it becomes difficult for the driver to recognize the image as the peripheral portion. Therefore, when the moving object is included in the peripheral portion of the image, the information highlighting the presence of the moving object is displayed by being superimposed on the image of the moving object, thereby improving visual recognition of the moving object by the driver.

Thus, by highlighting the moving object having the high degree of collision risk, the on-vehicle device 10 allows the driver to reliably recognize the presence of the moving object together with the degree of collision risk.

Figure 7:
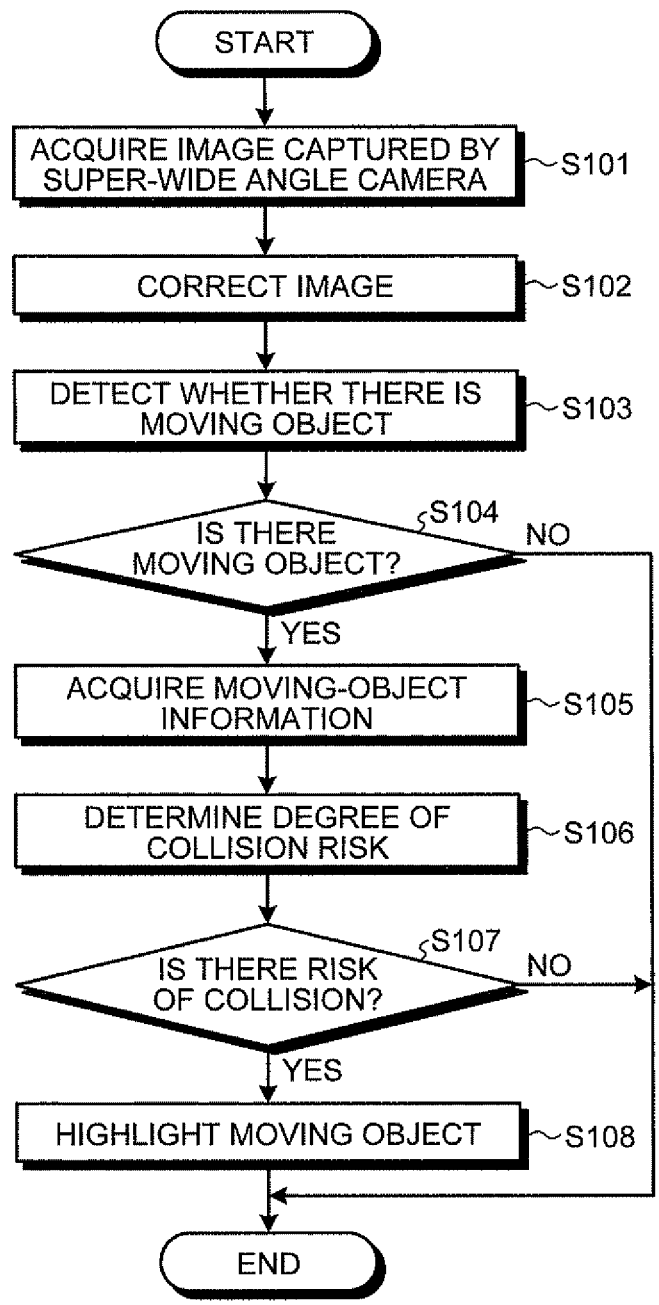
FIG. 7 is a flowchart representing an overview of a procedure for a moving-object recognition support process executed by the on-vehicle device.

Next, the process executed by the on-vehicle device 10 and the recognition support system according to the present embodiment will be explained with reference to FIG. 7. FIG. 7 is a flowchart representing an overview of a procedure for a moving-object recognition support process executed by the on-vehicle device 10.

As shown in FIG. 7, the image acquisition unit 15a acquires an image captured by the super-wide angle camera 11 (Step S101), and the image correction unit 15b corrects the image acquired at Step S101 (Step S102).

Then, the moving-object detector 15c detects whether there is a moving object based on the image corrected at Step S102 (Step S103), and determines whether the moving object is detected (Step S104).

When the moving-object detector 15c detects the moving object and determines that there is a moving object (Yes at Step S104), the moving-object information acquisition unit 15d acquires moving-object information for the detected moving object from the radar group 12 (Step S105).

Meanwhile, if the moving-object detector 15c does not detect the moving object and determines that there is no moving object (No at Step S104), then the process is ended.

Thereafter, the collision-risk determination unit 15e determines the degree of collision risk indicating a possibility of collision between the own vehicle and the moving object based on the moving-object information acquired at Step S105 and the own-vehicle information acquired from the sensor group 14 (Step S106).

The collision-risk determination unit 15e then determines whether the degree of collision risk is high or there is a risk of collision between the own vehicle and the moving object (Step S107). When the collision-risk determination unit 15e determines that there is a risk of collision (Yes at Step S107), then the moving-object warning unit 15f highlights the moving object according to the degree of collision risk and displays the highlighted moving object on the display 13 (Step S108), and the moving-object recognition support process executed by the on-vehicle device 10 is ended.

Meanwhile, if the collision-risk determination unit 15e determines that there is no risk of collision (No at Step S107), then the process is ended.

Incidentally, the present embodiment has explained the case where the super-wide angle camera 11 is mounted on the front of the vehicle, however, the present invention is not limited thereto. Therefore, a modification of a case where the super-wide angle camera 11 is mounted on any place other than the front of the vehicle will be explained below with reference to FIGS. 8A and 8B.

FIGS. 8A and 8B are diagrams illustrating examples of a mounting direction of the super-wide angle camera. FIG. 8A represents an example where the super-wide angle camera 11 is mounted on the left side of the vehicle, while FIG. 8B represents an example where the super-wide angle camera 11 is mounted on the rear side of the vehicle.

As shown in FIG. 8A, there is explained a case where a two wheeler is running from the left rear side of the own vehicle when the own vehicle with the super-wide angle camera 11 mounted on its left side is about to turn to the left at the intersection. In this case, because the super-wide angle camera 11 is mounted on the left side of the own vehicle, the field of view of the super-wide angle camera 11 is a range indicated by a circular arc in this figure, or covers the left side, the front side, and the rear side.

Therefore, the super-wide angle camera 11 can capture the two wheeler approaching the own vehicle from the left rear side thereof. This allows the on-vehicle device 10 to determine that the two wheeler is a moving object having a high degree of collision risk, and display highlighted two wheeler. In this case, even if a subsequent vehicle is following right behind the own vehicle, the on-vehicle device 10 allows the driver to reliably recognize the moving object having a high degree of collision risk.

Subsequently, as shown in FIG. 8B, there will be explained a case in which an approaching vehicle is running on a right lane from the right rear side of the own vehicle when the driver is about to change to the right lane while the own vehicle with the super-wide angle camera 11 mounted on the rear side thereof is running on the left lane of the road which has two lanes each way.

In this case, because the super-wide angle camera 11 is mounted on the rear side of the own vehicle, the imaging range of the super-wide angle camera 11 is a range indicated by a circular arc in this figure, or covers the rear side, the left side, and the right side.

Therefore, the super-wide angle camera 11 can capture an approaching vehicle that is running on the right rear side of the own vehicle. Thus, the on-vehicle device 10 highlights and displays an approaching vehicle from the rear side of the own vehicle, which allows the driver to reliably recognize the moving object having a high degree of collision risk even when the own vehicle changes the lane.

Here, the explanation has been made on mounting of the super-wide angle camera 11 on the rear side of the own vehicle, however, the same effect can also be obtained even if the super-wide angle camera 11 is mounted on the right side. In this way, detection omission can be prevented even if the moving object is approaching the own vehicle from either of the directions.

As explained above, the on-vehicle device and the recognition support system according to the present embodiment and the present modification are configured so that the super-wide angle camera captures an image of a wide angle range by the curved light receiver, the moving-object detector detects a moving object approaching the own vehicle from a mounting direction of the super-wide angle camera or any direction other than the mounting direction based on the image captured by the super-wide angle camera, the collision-risk determination unit determines the degree of collision risk indicating the possibility of collision between the moving object detected by the moving-object detector and the own vehicle, and the moving-object warning unit warns the driver of the presence of the moving object included in an image portion in which a distortion of the image is a predetermined value or more and warns the driver of the presence of the moving object according to the degree of collision risk determined by the collision-risk determination unit. Therefore, it is possible to achieve cost reduction of the on-vehicle device and to allow the driver to reliably recognize the presence of the detected moving object while preventing the detection omission of the moving object approaching the own vehicle from a blind corner for the driver. In addition, by warning the driver of the presence of the moving object which is included in the peripheral portion of the image and difficult for the driver to recognize, visual recognition of the moving object by the driver can be improved.

As explained above, the on-vehicle device and the recognition support system according to the present invention are useful to prevent the detection omission of the moving object approaching the own vehicle from any blind corner for the driver, and are particularly suitable for the case where it is desired to allow the driver to reliably recognize the presence of the detected moving object while reducing the cost of the on-vehicle device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An on-vehicle device mounted on a vehicle, comprising:
an imaging unit that captures an image of a wide angle range through a curved light receiver;
a moving-object detector that detects a moving object approaching an own vehicle from a mounting direction of the imaging unit and from any direction other than the mounting direction, based on the image captured by the imaging unit;
a collision-risk determination unit that determines a degree of collision risk indicating a possibility of collision between the moving object detected by the moving-object detector and the own vehicle; and
a moving-object warning unit that warns presence of the moving object included in an image portion in which a distortion of the image is a predetermined value or more, and warns the presence of the moving object according to the degree of collision risk determined by the collision-risk determination unit, wherein
when the moving object detected by the moving-object detector is included in the image captured by the imaging unit, the moving-object warning unit displays information highlighting the presence of the moving object by superimposing the information on a portion of the image where the moving object appears in the image including the moving object.

2. The on-vehicle device according to claim 1, further comprising:
a moving-object information acquisition unit that acquires, as moving-object information, a distance between the moving object detected by the moving-object detector and the own vehicle, an approaching direction of the moving object with respect to the own vehicle, and a moving speed of the moving object, wherein
the collision-risk determination unit determines the degree of collision risk based on own-vehicle information including a running speed and a running direction of the own vehicle and the moving-object information acquired by the moving-object information acquisition unit.

3. The on-vehicle device according to claim 1, wherein the imaging unit is mounted on any one or two or more locations of a front side, a rear side, a right side, and a left side of the own vehicle.

4. The on-vehicle device according to claim 1, further comprising an image correction unit that corrects a distortion of the image captured by the imaging unit, wherein
the moving-object detector detects the moving object approaching the own vehicle based on the image corrected by the image correction unit.

5. The on-vehicle device according to claim 1, wherein the moving-object warning unit displays information highlighting the presence of the moving object based on the degree of collision risk determined by the collision-risk determination unit, by superimposing the information on the image including the moving object detected by the moving-object detector.

6. A recognition support system comprising:
an on-vehicle device mounted on a vehicle; and
a ground server device that performs wireless communication with the on-vehicle device, wherein
the on-vehicle device or the ground server device includes a moving-object detector that detects a moving object approaching a vehicle mounting thereon the on-vehicle device based on an image received from the on-vehicle device, and a collision-risk determination unit that determines a degree of collision risk indicating a possibility of collision between the moving object detected by the moving-object detector and the vehicle, and the on-vehicle device includes an imaging unit that captures an image of a wide angle range through a curved light receiver, and a moving-object warning unit that warns presence of the moving object included in an image portion in which a distortion of the image is a predetermined value or more, and warns the presence of the moving object according to the degree of collision risk determined by the collision-risk determination unit, wherein when the moving object detected by the moving-object detector is included in the image captured by the imaging unit, the moving-object warning unit displays information highlighting the presence of the moving object by superimposing the information on a portion of the image where the moving object appears in the image including the moving object.

* * * * *